United States Patent Office 3,651,077
Patented Mar. 21, 1972

3,651,077
1,4-OXIDO-3-AZA-A-HOMO-STEROIDS AND PROCESS FOR THEIR MANUFACTURE
Oskar Jeger, Zollikerberg, Zurich, and Hans Ueli Wehrli, Schaffhausen, Switzerland, assignors to Ciba Corporation, New York, N.Y.
No Drawing. Filed Mar. 25, 1968, Ser. No. 715,496
Claims priority, application Switzerland, Mar. 31, 1967, 4,594/67
Int. Cl. C07d 85/26
U.S. Cl. 260—307 F
10 Claims

ABSTRACT OF THE DISCLOSURE 1,4-oxido-3-aza-A-homosteroids represent a class of steroids among which there are to be found natural products, such as Samandarin, the principal alkaloid of the salamander skin gland extract, having the formula

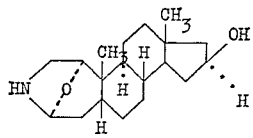

Such a process comprises converting the aldehyde group in a 3-ether of a 1α-aldehydo-3-hydroxy-2-oxa-5α-steroid or of a 1β-aldehydo-3-hydroxy-2-oxa-5β-steroid into a free aminomethyl group and treating resulting compounds with an acid.

This compound and derivatives related to it, such as the new 1β,4β-oxido-3-aza-A-homosteroids of the androstane series can be prepared by the new process of the present invention. These new compounds have, like Samandarin, a local anaesthetic effect and they also increase the blood pressure.

SUMMARY OF THE INVENTION

The process of the invention for the preparation of 1,4-oxido-3-aza-A-homosteroids consists in converting the aldehyde group in a 3-ether of a 1α-aldehydo-3-hydroxy-2-oxa-5α-steroid or of a 1β-aldehydo-3-hydro-2-oxa - 5β- steroid into a free aminomethyl group and treating resulting compounds with an acid. In the compounds thus obtained substituents present, such as oxygenated functions, e.g. in ring D, may be converted or eliminated in an appropriate manner known in the art so to obtain the desired compounds having pharmacological action, for instance Samandarin. The invention also comprises the new 1β,4β-oxido-3-aza-A-homosteroids, especially such of the androstane series, having analogous properties to Samandarin. The new starting compounds of the process disclosed and their precursors, as well as intermediates also form part of the invention.

The subject of the present invention is a process for the manufacture of 1,4-oxido-3-aza-A-homosteroids having the following partial formulae of the ring A

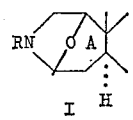 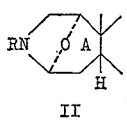

wherein R denotes hydrogen, a hydrocarbon residue or an acyl group, that is to say of 1β,4β-oxido-3-aza-A-homo-5α-steroids and 1α,4α-oxido-3-aza-A-homo-5β-steroids, their acid addition salts and quaternary ammonium salts, starting from 2-oxa-steroids having the following partial formulae

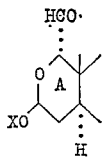 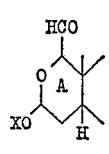

of the ring A, wherein XO denotes an etherified hydroxyl group.

Steroid derivatives having the above structure II of the ring A have, as is known, been found amongst the constituents of the salamander alkaloids. Thus the principal alkaloid of the salamander skin gland extract, Samandarin, has the following formula

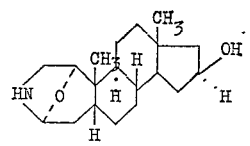

The process of the present application now makes it possible to obtain Samandarin and similar compounds starting with compounds which are easily manufactured from Δ¹-3-oxo-steroids or Δ²-1-hydroxy-steroids.

The process of the present application is characterised in that in a 3-ether of a 1α-aldehydo-3-hydroxy-2-oxa-5α-steroids or of a 1β-aldehydo-3-hydroxy-2-oxa-5β-steroid having the partial Formulae III or IV of the ring A, the aldehyde group is converted into a free aminomethyl group, resulting compounds are converted to the 1β,4β-oxido-3-aza-A-homo-5α-steroids or 1α,4α-oxido-3-aza-A-homo-5β-steroids respectively by treatment with an acid, and, if desired, at any desired stage protected hydroxyl or oxo groups are liberated and/or free hydroxyl groups or oxo groups are functionally converted and/or resulting 1,4-oxido-3-aza-A-homosteroids are converted to their derivatives which are substituted at the nitrogen atom by a hydrocarbon residue or an acyl group and/or to their acid addition salts or quaternary ammonium salts.

The 3-ethers of 1-aldehydo-3-hydroxy-2-oxa-steroids which are to be used as starting substances preferably belong to the pregnane, cholane, cholestane, spirostane or cardanolide series, but particularly to the androstane series. Preferred starting substances are those of the androstane series which have the formulae

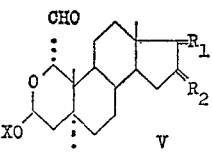 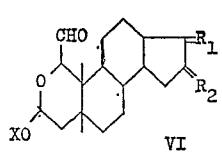

wherein $R_1$ denotes a free or protected, for example esterified or etherified, hydroxyl group together with a hydrogen atom, or a free or protected, for example ketalised oxo group, and in this case $R_2$ represents two hydrogen atoms, or $R_1$ denotes two hydrogen atoms and $R_2$ denotes a free or protected hydroxyl group together with a hydrogen atom or an oxo group, and XO denotes an etherified hydroxyl group.

The abovementioned esterified hydroxyl groups are above all those which are derived from organic carboxylic acids of the aliphatic, alicyclic, aromatic or heterocyclic series, especially from those having 1–18 carbon atoms, for example formic acid, acetic acid, propionic acid, the butyric acids, valeric acids such as n-valeric acid, or trimethylacetic acid, trifluoracetic acid, the caproic acids, such as β-trimethylpropionic acid or diethylacetic acid, the oenanthic, caprylic, pelargonic, caparic and undecylic acids, for example undecylenic acid, lauric, myristic, palmitic or stearic acids, for example oleic acid, cyclopropanecarboxylic, cyclobutanecarboxylic, cyclopentanecarboxylic and cyclohexanecarboxylic acids, cyclopropylmethanecarboxylic acid, cyclobutylmethanecarboxylic acid, cyclopentylethanecarboxylic acid, cyclohexylethanecarboxylic acid, cyclopentylpropionic acid, cyclohexylpropionic acid, phenylacetic or phenylpropionic acid, benzoic acid, phenoxyalkane acids such as phenoxyacetic acid, dicarboxylic acids such as succinic acid, phthalic acid, quinolinic acid, furan-2-carboxylic acid, 5-tert.-butyl-furan-2-carboxylic acid, 5-bromo-furan-2-carboxylic acid, nicotinic acid or isonicotinic acid, or sulphonic acids, such as benzenesulphonic acids, or inorganic acids, such as for example phosphoric or sulfuric acids.

As etherified hydroxyl groups there should especially be quoted those which are derived from alcohols having 1–8 carbon atoms such as lower aliphatic alkanols such as ethyl alcohol, methyl alcohol, propyl alcohol, isopropyl alcohol, butyl alcohols or amyl alcohols or araliphatic alcohols, especially monocyclic aryl-lower aliphatic alcohols, such as benzyl alcohol, or heterocyclic alcohols such as α-tetrahydropyranol or α-tetrahydrofuranol.

The process according to the present application can be illustrated for the case of a typical androstane derivation by the following reaction scheme:

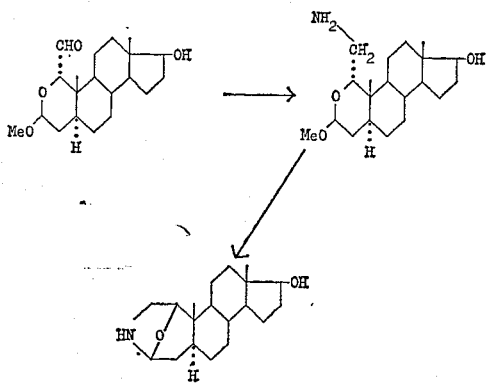

17-oxygenated 1,4-oxido-3-aza-A-homo-5-androstane derivatives are particularly of importance with a view to the manufacture of Samandarin or the isomer corresponding to the partial Formula I, since the 17-oxygen containing group can easily be displaced into the 16-position in a manner which is in itself known. A particular embodiment of the present process is thus characterised in that an androstane compound of one of the above Formulae V or VI, in which $R_2$ represents two hydrogen atoms, is used as the starting substance and that after converting the aldehyde group to the aminomethyl group and cyclisation to give the 1,4-oxido-3-aza-A-homo-androstane the 17-oxygen function is, optionally after conversion to a 17-oxo group, displaced into the 16-position in a manner which is in itself known and, if desired, at any desired stage protected hydroxyl or oxo groups are liberated and/or free hydroxyl groups or oxo groups are functionally converted and/or resulting compounds are converted to their derivatives which are substituted by a hydrocarbon residue or an acyl group at the nitrogen atom and/or their acid addition salts or quaternary ammonium salts.

The conversion of the 1-aldehyde group to an aminomethyl group in accordance with the invention may for example be carried out in a manner which is in itself known, for example via the oxime and/or the nitrile. Both compounds may for example be converted to the aminomethyl compound by complex light metal hydrides such as lithium aluminium hydride. The conversion of the aldehyde to the oxime is achieved in the usual way by treatment with hydroxylamine or a derivative, especially a salt, and the conversion of the oxime group to the nitrile group also takes place in a manner which is in itself known, for example by dehydration by means of an acid anhydride or an acid chloride, for example acetic anhydride, phosphorus oxychloride or thionyl chloride, in the presence of a tertiary base such as pyridine.

The cyclisation of the aminomethyl compound so obtained to give the 1,4-oxido-3-aza-A-homosteroid takes place by an acid treatment, preferably with aqueous organic aliphatic acids such as acetic acid, advantageously at elevated temperature.

In resulting 1,4-oxido-3-aza-A-homosteroids, protected hydroxyl or oxo groups which are present can be liberated in a manner which is in itself known. Thus, for example esterified hydroxyl groups can be liberated by alkaline hydrolysis and ether groups by acid hydrolysis or reductively. Ketalised oxo groups may for example be converted to free oxo groups by the action of acids. Equally, free hydroxyl and/or oxo groups may be functionally converted in a manner which is in itself known, for example hydroxyl groups may be esterified or etherified. For this, the abovementioned acids or alcohols or their reactive functional derivatives are preferably used.

The displacement of a 17-oxo group in resulting 1,4-oxido-3-aza-A-homo-androstanes into the 16-position can also be carried out in a manner which is in itself known, for example, via the 16-hydroxy-methylene derivatives of the 17-oxo compound or via their 16-isonitroso derivatives or finally via their $\Delta^{16}$-enolacylates. A 16-oxo group obtained in this way can be converted into a free, esterified or etherified hydroxyl group if desired, in a known manner.

The 1,4-oxido-3-aza-A-homosteroids produced in this way can finally be converted to their acid addition salts or to their derivatives substituted by a hydrocarbon residue or an acyl group at the nitrogen atom and/or quaternary ammonium salts. In order to manufacture the acid addition salts, acids which are suitable for the formation of therapeutically usable salts are above all used. As such there may be quoted, by way of example: hydrogen halide acids, sulphuric acids, phosphoric acids, nitric acid, perchloric acid, aliphatic, alicyclic, aromatic or heterocyclic carboxylic or sulphonic acids such as formic, acetic, propionic, succinic, glycollic, lactic, malic, tartaric, citric, ascorbic, maleic, hydroxymaleic or pyruvic acids; phenylacetic, benzoic, p-aminobenzoic, anthranilic, p-hydroxybenzoic, salicylic or p-aminosalicylic acids, embonic acid, methanesulphonic, ethanesulphonic, hydroxyethanesulphonic and ethylenesulphonic acids; halogenobenzenesulphonic, toluenesulphonic, naphthalenesulphonic acids or sulphanilic acid; methionine, tryptophan, lysine or arginine.

These or other salts of the new compounds, such as for example the picrates, can also serve for the purification of the resulting bases, by converting the bases to salts, isolating these and again liberating the bases from the salts. Because of the close relationship between the bases in the free form and in the form of their salts the free bases are, in the preceding and following text, also where appropriate to be understood as the corresponding salts in respect of sense and purpose.

The manufacture of derivatives substituted by a hydrocarbon residue or an acyl group at the nitrogen takes place in a manner which is in itself known. Thus N-alkylated derivatives can be obtained by reacting the N-unsubstituted compounds with an alkylating agent such as an alkyl halide, for example methyl or ethyl iodide, in the presence of a suitable acid-bonding reagent, for example an alkali metal hydroxide, carbonate or alcoholate. In particular, N-methyl derivatives can be manufactured by reacting the unsubstituted 1,4-oxido-3-aza-A-homosteroids with formaldehyde, optionally in the presence of formic acid, or with dimethyl sulphate.

The N-acyl derivatives can be obtained by reacting the N-unsubstituted compounds with an acid anhydride or halide, for example a lower aliphatic acid anhydride or halide, such as acetic anhydride or acetyl chloride in the presence of an acid-bonding reagent, for example a tertiary base such as pyridine or collidine. In this acylation, free hydroxyl groups which may be present may also be acylated, depending on the reaction conditions used. Thus for example when acylating with acetic anhydride in pyridine at elevated temperatures the N, 17-O-diacetyl compound is obtained in the case of a 17-hydroxy- compound, whereas at room temperature only the 17-hydroxyl group is acylated.

The compounds of Formulae III and IV to be used as starting substances may be manufactured from the 1-hydroxymethyl-3-oxo-2-oxa-steroids which are for example described in our French Pat. No. 1,502,384, by the reaction sequence

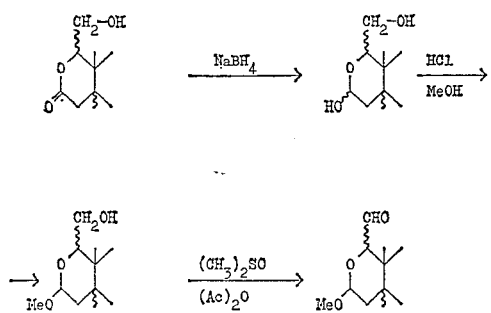

and optionally by epimerisation at the carbon atom 1.

The reduction of the 1-hydroxymethyl-3-oxo-2-oxa-steriods to the corresponding 1-hydroxymethyl-3-hydroxy-2-oxa-steriods is advantageously carried out with complex light metal hydrides of the type of sodium borohydride, especially with sodium borohydride or tri-tert.-butoxy-aluminium hydride or also with organo-aluminium hydrides such as for example diisobutyl-aluminium hydride. The resulting reaction product is selectively etherified in the 3-position, advantageously by treatment with an alcohol in the presence of an acid reagent, for example methanol and hydrogen chloride. The oxidation to the aldehyde advantageously takes place by treatment with a mild oxidising agent; in particular, the use of a mixture of dimethyl sulphoxide and acetic anhydride has proved advantageous.

In compounds so obtained, which contain the 1-substituent in the trans-position to the 5-H atom, an epimerisation is carried out by treatment with strong alkali, for example with sodium methylate in alcoholic solution, for example methyl alcohol solution.

In this way compounds are obtained which contain the substituents in the 1- and 5-position in the cis-configuration, that is to say the 3-ethers of 1α-aldehydo-3-hydroxy - 2 - oxa - 5α - steroids or of 1β-aldehydo-3-hydroxy-5β-steroids.

The abovementioned 1 - hydroxymethyl - 3 - oxo-2-oxa-steroids are according to the process of the abovementioned French patent, obtained by irradiating 1-hydroxy - 2RO - 3 - oxo - steroids, wherein R represents hydrogen or the residue of a lower aliphatic carboxylic acid, with ultraviolet light and, if desired, saponifying ether or ester groups present in resulting compounds to free hydroxyl groups and/or esterifying, etherifying or oxidising free hydroxyl groups which are present. The abovementioned 1-hydroxy-2RO-3-oxo-steroids may in turn be obtained from Δ¹-3-oxo-steroids by hydroxylation of the 1,2-double bond, for example with hydrogen peroxide and osmium tetroxide and subsequent esterification.

The starting substances for the present process may however also be manufactured in accordance with the process outlined in the following reaction scheme:

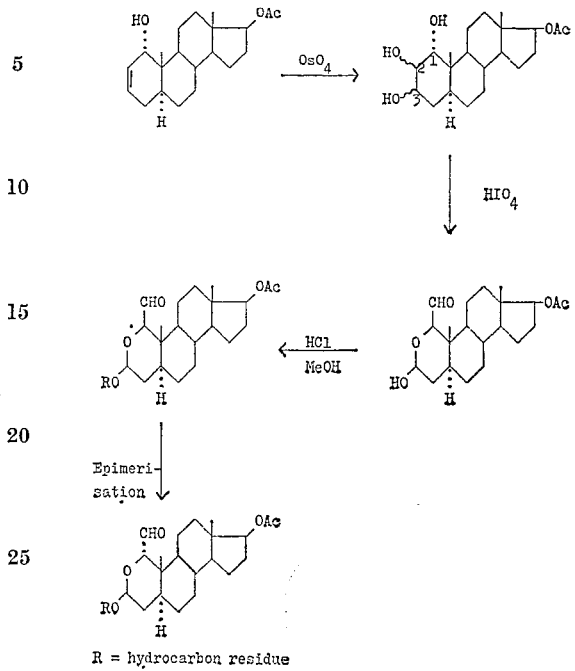

R = hydrocarbon residue

This process consists of dihydroxylating the double bond in a 1 - hydroxy - Δ² - 5ξ - steroid, treating the resulting 1,2,3 - trihydroxy - steroid with periodic acid and etherifying the resulting (3,1)-hemiacetal of the 1 - hydroxy - 2,3 - seco-steroid-2,3-dialdehyde in the 3-position and optionally treating with strong alkali in order to epimerise the 1-substituent. The hydroxylation of the 2,3-double bond can be carried out in a manner which is in itself known, for example by treatment with osmium tetroxide. The etherification of the 3-hydroxyl group of the abovementioned hemiacetal of the 1 - hydroxy - 2,3-seco - steroid - 2,3 - dialdehyde most advantageously takes place by treatment with, for example, methanolic hydrogen chloride. The 1-hydroxy - Δ² - 5ξ - steroids may be manufactured from Δ¹ - 3 - oxo - steroids by conversion to the 1,2-epoxide and treatment of the latter with hydrazine.

A further subject of the present invention are 1β,4β-oxido - 3 - aza - A - homosteroids, especially those of formula

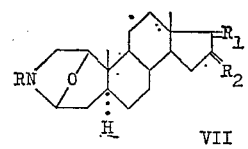

wherein R₁ denotes a free, esterified or etherified hydroxyl group together with a hydrogen atom or a free or protected oxo group and in this case R₂ represents two hydrogen atoms, or R₁ denotes two hydrogen atoms and R₂ denotes a free or protected hydroxyl group together with a hydrogen atom or an oxo group and R denotes hydrogen, a hydrocarbon residue or an acyl group, and their acid addition salts and quaternary ammonium salts.

The new compounds of the above formula have a pharmacological effect similar to Samandarin and in particular increase the blood pressure and have a local anaesthetic effect. They are furthermore intermediates for the manufacture of Samandarin, Samandarone and other derivatives of these alkaloids.

Compounds of the above Formula VII in which the esterified or the etherified hydroxyl groups are those initially recited as being particularly preferred should be especially mentioned, but particularly those in which R₁ or R₂ denotes a free hydroxyl group or a hydroxyl group esterified with a lower aliphatic acid. In such compounds the residue R preferably represents a hydrogen atom or a lower alkyl residue such as a methyl, ethyl or propyl residue, or a lower aliphatic residue such as a formyl, acetyl or propionyl residue.

A further subject of the invention consists of the new intermediates produced in the course of the above process as well as the new starting substances or preliminary stages for the manufacture of the starting substances, that is to say 1α - hydroxymethyl - 3 - hydroxy - 2 - oxa-5β- steroids and 1β - hydroxymethyl - 3 - hydroxy - 2 - oxa-5α-steroids and their 3-ethers, 1α-aldehydo - 3 - hydroxy-2 - oxa - 5β - steroids and 1β - aldehydo - 3 - hydroxy-2-oxa - 5α - steroids and their 3 - ethers, 3 - ethers of 1α-aldehydo - 3 - hydroxy - 2 - oxa - 5α - steroids and of 1β - aldehydo - 3 - hydroxy - 2 - oxa - 5β - steroids and their oximes, 3-ethers of 1α - cyano - 3 - hydroxy-2-oxa - 5α - steroids and of 1β - cyano - 3 - hydroxy-2-oxa - 5β - steroids, 3-ethers of 1α - aminomethyl-3-hydroxy - 2 - oxa - 5α - steroids and of 1β - aminomethyl-3 - hydroxy - 2 - oxa - 5β - steroids. In particular the present invention relates to the compounds of the following formulae

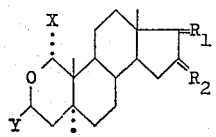   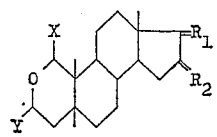

VIII    IX wherein $R_1$ and $R_2$ have the abovementioned significance, Y denotes an etherified hydroxyl group and X an aldehyde, oxime, nitrile or aminomethyl group. In these formulae Y especially denotes one of the abovementioned preferred ether groups. The compound of Formulae VIII and IX in which $R_2$ denotes hydrogen and $R_1$ a free or esterified hydroxyl group, especially one of the preferred esterified hydroxyl groups described above, but above all an acetoxy group, should be particularly emphasised.

The invention also comprises compounds of formulae

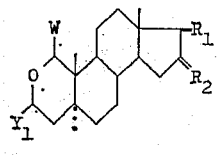   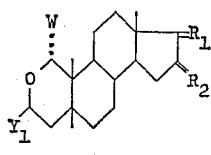

X    XI in which $Y_1$ represents a free or etherified hydroxyl group and W a hydroxymethyl group or aldehydo group and $R_1$ and $R_2$ have the significance given above.

The invention also relates to those embodiments of the process which start from a compound obtainable as an intermediate at any stage and the missing stages are carried out or in which a starting substance is formed under the reaction conditions.

The present invention also relates to the manufacture of pharmaceutical preparations for use in human or veterinary medicine which contain the new pharmacologically active substances of the present application which have been described above as active substances together with a pharmaceutical excipient. As excipients, organic or inorganic substances which are suitable for enteral, for example oral, parenteral or topical, administration are used. Possible substances for forming these are substances which do not react with the new compounds such as for example water, gelatine, lactose, starch, magnesium stearate, talc, vegetable oils, benzyl alcohols, gums, polyalkylene glycols, white petroleum jelly, cholesterol and other known pharmaceutical excipients. The pharmaceutical preparations may be in a solid form, for example as tablets, dragées or capsules, or in a liquid or semi-liquid form as solutions, suspensions, emulsions, ointments or creams. These pharmaceutical preparations are optionally sterilised and/or contain adjuvants such as preservatives, stabilisers, wetting agents, or emulsifiers, salts for regulating the osmotic pressure or buffers. They may also contain other therapeutically valuable substances. The new compounds may also serve as starting products for the manufacture of other valuable compounds.

The compounds of the present application may also be used as feedstuffs additives.

The invention is described in more detail in the following examples.

EXAMPLE 1

2.0 g. of 1β-hydroxymethyl-3-oxo-17β-acetoxy-2-oxa-5α-androstane in 500 ml. of methanol are mixed at —20° C., with stirring, with 2.0 g. of sodium borohydride in 30 ml. of water. The mixture is then left for 45 minutes at —20° C. and is worked up as usual. Chromatography of the crude product in ethyl acetate on silica gel and subsequent crystallisation from acetone-petroleum ether yields 1650 mg. of the 1β-hydroxymethyl-3-hydroxy-17β-acetoxy-2-oxa-5α-androstane of melting point 171–2° C., $[\alpha]_D = -41°$ (c.=0.5). In the infrared absorption spectrum bands occur at 3550, 1720 and 1250μ.

300 mg. of the product so obtained are dissolved in 10 ml. of methanol, mixed with 10 ml. of 0.2 N HCl (anhydrous) in methanol and left for 7 minutes at room temperature. The mixture is then neutralised with an aqueous sodium carbonate solution and worked up. Chromatography of the crude product in benzene-ethyl acetate (4:1) on silica gel yields 260 mg. of the 1β-hydroxymethyl-3-methoxy - 17β - acetoxy-2-oxa-5α-androstane which after three crystallisations from acetone-petroleum ether melts at 144° C. $[\alpha]_D = -55°$ (0.45). In the infrared absorption spectrum bands occur at 3600, 1720 and 1255μ.

1100 mg. of the resulting product are stirred overnight at room temperature in 21 ml. of absolute dimethyl sulphoxide and 15 ml. of acetic anhydride. The mixture is then evaporated in vacuo and worked up as usual. Chromatography on silica gel in benzene-ethyl acetate (4:1) yields 920 mg. of the 1β-aldehydo-3-methoxy-17β-acetoxy-2-oxa-5α-androstane which after three crystallizations from acetone-petroleum ether melts at 143° C. $[\alpha]_D = -66°$ (c.=0.39). In the infrared absorption spectrum bands occur at 2730, 1730 and 1255μ.

900 mg. of this product are boiled for 6 hours under reflux, in a nitrogen atmosphere, with 900 mg. of sodium methylate in 50 ml. of methanol. The usual working up and chromatography in benzene-ethyl acetate (4:1) on silica gel yields 770 mg. of amorphous 1α-aldehydro-3-methoxy-17β-hydroxy-2-oxa-5α - androstane which shows the following bands in the infrared absorption spectrum: 3600, 2740, 2660, 1730 and 1715μ.

300 mg. of this amorphous product are boiled for 1 hour under reflux with 300 mg. of hydroxylamine hydrochloride in 20 ml. of pyridine. The mixture is then evaporated in vacuo and is worked up in the usual manner using methylene chloride as the organic phase. Chromatography of the crude product in ethyl acetate on silica gel yields 250 mg. of crystals of the oxime of the 1α-aldehydro-3-methoxy-17β-hydroxy-2-oxa-5α - androstane of melting point 231° C. $[\alpha]_D = -78°$ (0.31). In the infrared absorption spectrum bands occur at 3580 and 1600μ.

200 mg. of the resulting oxime are boiled for 3 hours under reflux in 15 ml. of an acetic anhydride-pyridine mixture (1:1). The mixture is then evaporated in vacuo, the evaporation residue dissolved in methylene chloride is filtered through neutral aluminium oxide (activity 3) and the resulting crude product is chromatographed in benzene-ethyl acetate (4:1) on silica gel. 130 mg. of amorphous 1α - cyano - 3 - methoxy - 17β-acetoxy-2-oxa-5α-androstane result. This material shows bands in the infrared spectrum at 1730 and 1250μ.

240 mg. of this nitrile are boiled for 2 hours with 400 mg. of lithium aluminium hydride in 20 ml. of absolute ether. Water is then carefully added at 0° C., the mixture thereafter diluted with methylene chloride and the precipitated aluminium hydroxide filtered off. The filtrate is evaporated in vacuo and the residue is chromatographed on silica gel in a mixture of four parts of benzene saturated with concentrated aqueous ammonia and one part of methanol. Thereupon 190 mg. of amorphous chromatographically homogeneous 1α - aminomethyl-3-methoxy-17β - hydroxy - 2 - oxa - 5α - androstane are obtained. Bands in the infrared absorption spectrum at 3600 and 3380μ.

The same product is also obtained if the abovementioned oxime is directly reduced with lithium aluminium hydride as follows:

80 mg. of the oxime are boiled for 2 hours with 200 mg. of lithium aluminium hydride in 10 ml. of absolute ether. Water is then carefully added at 0° C., the mixture thereafter diluted with methylene chloride, and the precipitated aluminium hydroxide filtered off. The filtrate is evaporated in vacuo and the residue is chromatographed on silica gel in a mixture of 4 parts of benzene saturated with concentrated aqueous ammonia and 1 part of methanol. Thereupon 42 mg. of chromatographically homogeneous amorphous 1α - aminomethyl-3-methoxy-17β-hydroxy - 2 - oxa - 5α - androstane are obtained.

120 mg. of the amine obtained in this way or obtained after the reduction of the nitrile described above are boiled for 1 hour in 3 ml. of aqueous glacial acetic acid of 75% strength. The mixture is then evaporated in vacuo, neutralised with sodium bicarbonate and worked up in the usual manner. The resulting crude product is chromatographed on silica gel in benzene (saturated with aqueous concentrated ammonia)-methanol (4:1) whereupon 50 mg. of crystals are eluted, which represent the 1β,4β-oxido-3-aza-17β-hydroxy-A-homo-5α-androstane of melting point 99–101° C. $[\alpha]_D = -7°$ (0.76). Infrared absorption bands may be observed at 3500, 850 and 835μ.

If the same reaction sequence is applied to the 1α-hydroxymethyl - 3 - hydroxy - 17β - acetoxy - 2 - oxa-5β-androstane of melting point 193–194° C., $[\alpha]_D = +76°$ (c.=0.52), then the 1α,4α-oxido-3-aza-17β-hydroxy-A-homo - 5β - androstane of melting point 190–191° C. is obtained via the 1α - hydroxymethyl - 3 - hydroxy-17β-acetoxy - 2 - oxa - 5β - androstane (melting point 212° C. [3× from acetone], infrared bands at 3600, 3400, 1730 and 1255μ) and its 3-methyl ether (melting point 160° C. [2× from acetone-petroleum ether], infrared bands at 3600, 1730 and 1255μ).

EXAMPLE 2

The 1β - aldehydro - 3 - methoxy - 17β - acetoxy-2-oxa - 5α - androstane described in the preceding example may also be prepared in the following manner:

1000 mg. of 1α-hydroxy-17β-acetoxy-$\Delta^2$-5α-androstane are allowed to stand for 1 day in the dark at room temperature with 1000 mg. of osmium tetroxide in 12 ml. of benzene-pyridine (20:1). The mixture is then diluted with 25 ml. of methanol, 3.8 g. of sodium bicarbonate and 3.8 g. of sodium bisulphite in 37 ml. of water are added, and the resulting mixture is stirred for 5 hours at room temperature. Thereafter the mixture is filtered, the residue rinsed with hot chloroform, and the filtrate worked up in the usual manner using chloroform as the organic phase. Chromatography of the crude product on silica gel in ethyl acetate-methanol (9:1) yields 480 mg. of chromatographically homogeneous crystalline 1α,2,3-trihydroxy - 17β - acetoxy - 5α - androstane which is not purified further. Infrared bands at 3500 (broad), 1720 and 1255μ.

160 mg. of the crude product in 24 ml. of methanol and 6 ml. of pyridine are treated with 960 mg. of periodic acid in 4.5 ml. of water and allowed to stand for 2 hours at room temperature. The usual working up and subsequent chromatography on silica gel in ethyl acetate yields 130 mg. of 1β-aldehydro-3-hydroxy-17β-acetoxy-2-oxa-5α-androstane which melts at 164° C. (after three recrystallisations from acetonepetroleum ether)

$$[\alpha]_D = -30°$$

(0.4). Infrared bands occur at 3550, 3450, 1720 and 1250μ.

300 mg. of the product so obtained are dissolved in 20 ml. of 0.1 N anhydrous methanolic hydrochloric acid and allowed to stand for 7 minutes at room temperature. The mixture is then neutralised with aqueous sodium bicarbonate and worked up in the usual way. Chromatography of the crude product on silica gel in benzene-ethyl acetate (4:1) yields 170 mg. of the 1β-aldehydo-3-methoxy-17β-acetoxy-2-oxa-5α-androstane of melting point 143° C. (recrystallised three times from acetone-petroleum ether). Identification with the prdouct prepared in Example 1 by mixed melting point, infrared spectrum and thin layer chromatogram.

The infrared spectra (in cm.$^{-1}$) and the rotations are measured in chloroform. Usual working up: dissolution in ethyl acetate and washed with saturated aqueous sodium chloride solution until neutral.

We claim:

1. A member selected from the group consisting of a compound of the formulae

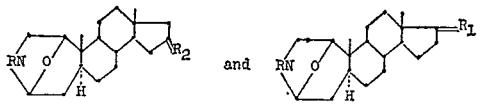

wherein $R_1$ is hydroxy; hydroxy esterified by a member selected from the group consisting of formic acid, acetic acid, propionic acid, the butyric acids, and the valeric acids, and hydroxy etherified by a member selected from the group consisting of ethyl alcohol, methyl alcohol, propyl alcohol, isopropyl alcohol, butyl alcohols and amyl alcohols, and an oxo group, $R_2$ is a member selected from the group consisting of hydroxyl, hydroxyl esterified by a member selected from the group consisting of formic acid, acetic acid, propionic acid, the butyric acids, and the valeric acids and an oxo group and R is a member selected from the group consisting of hydrogen and a lower alkyl radical and a therapeutically useful acid addition salt thereof.

2. A composed as claimed in claim 1 and which is a member selected from the group consisting of 1β,4β-oxido - 17β-hydroxy-3-aza-A-homo-5α-androstane and a carboxylic acid ester derived from a member selected from the group consisting of formic acid, acetic acid, propionic acid, the butyric acids and the valeric acids thereof.

3. Process for the manufacture of 1,4-oxido-3-aza-A-homo-steroids which comprises:
   (a) reacting a steroid selected from the group consisting of compounds of the formulae

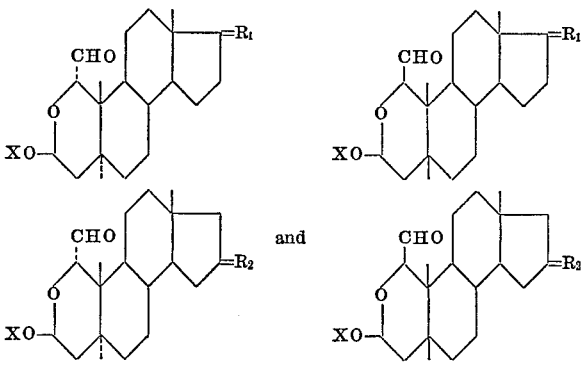

in which $R_1$ is hydroxy; hydroxy esterified by a member selected from the group consisting of formic acid, acetic acid, propionic acid, the butyric acids, and the valeric acids, $R_2$ is a member selected from the group consisting of hydroxyl, hydroxyl esterified by a member selected from the group consisting of formic acid, acetic acid, propionic acid, the butyric acids, and the valeric acids with a member selected from the group consisting of a hydroxylamine and a salt thereof;

(b) dehydrating the resulting oxime with a member selected from the group consisting of acetic anhydride, phosphorus oxychloride and thionyl chloride in the presence of a tertiary base;

(c) reducing the resulting nitrile with lithium aluminum hydride; and (d) treating the compounds so obtained with an aqueous acid.

4. Process as claimed in claim 3, wherein the 1,4-oxido-3-aza-A-homo-steroid obtained is converted into a therapeutically useful salt.

5. Process as claimed in claim 3, wherein the 1,4-oxido-3-aza-A-homo-steroid obtained is converted into a lower alkyl derivative at the nitrogen atom by reacting said steroid with an alkylating agent.

6. Process as claimed in claim 3, wherein an organic aliphatic carboxylic acid is used in converting the 1-aminomethyl group into the 1,4-oxido-3-aza-A-homo-steroid.

7. Process as claimed in claim 3, wherein aqueous acetic acid is used at an elevated temperature in converting the 1-aminomethyl group into the 1,4-oxido-3-azo-A-homo-steroid.

8. Process as claimed in claim 3, wherein the aldehyde group is converted into the oxime group with a member selected from the group consisting of hydroxylamine and a salt thereof, the oxime group is converted into the nitrile group by the action of acetic anhydride and pyridine and the nitrile group so formed is reduced to the aminomethyl group with lithium aluminium hydride.

9. Process as claimed in claim 3, wherein a member selected from the group consisting of $1\alpha$-aldehydo-3-methoxy-$17\beta$-hydroxy-2-oxa-$5\alpha$-androstane and a carboxylic acid ester derived from a member selected from the group consisting of formic acid, acetic acid, propionic acid, the butyric acids, and the valeric acids, thereof is used as starting material.

10. Process as claimed in claim 3, wherein a member selected from the group consisting of $1\beta$-aldehydo-3-methoxy - $17\beta$-hydroxy-2-oxa-$5\beta$-androstane and a carboxylic acid ester derived from a member selected from the group consisting of formic acid, acetic acid, propionic acid, the butyric acids, and the valeric acids, thereof is used as starting material.

References Cited

FOREIGN PATENTS 1,502,384  10/1967  France.

ALEX MAZEL, Primary Examiner

R. V. RUSH, Assistant Examiner

U.S. Cl. X.R.

260—345.3; 424—272